United States Patent
Kawabe et al.

(10) Patent No.: US 7,832,068 B2
(45) Date of Patent: *Nov. 16, 2010

(54) METHOD OF PRODUCING A SPREAD MULTI-FILAMENT BUNDLE AND AN APPARATUS USED IN THE SAME

(75) Inventors: Kazumasa Kawabe, Fukui (JP); Shigeru Tomoda, Fukui (JP)

(73) Assignee: Fukui Prefectural Government, Fukui-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/458,100

(22) Filed: Jun. 30, 2009

(65) Prior Publication Data
US 2009/0271960 A1    Nov. 5, 2009

Related U.S. Application Data

(63) Continuation of application No. 10/559,670, filed as application No. PCT/JP2004/010006 on Jul. 7, 2004, now Pat. No. 7,571,524.

(30) Foreign Application Priority Data

Jul. 8, 2003    (JP)    ............... 2003-193895
Feb. 12, 2004    (JP)    ............... 2004-034778

(51) Int. Cl.
*D01D 11/02*    (2006.01)
(52) U.S. Cl. ........................... 28/283; 28/282
(58) Field of Classification Search ............ 28/283, 28/282, 220, 271, 258, 253, 219; 19/66 T, 19/66 R; 264/211.14, 211.15, 211.17, 70; 226/7, 97.4
See application file for complete search history.

(56) References Cited

U.S. PATENT DOCUMENTS

| 2,244,203 A | | 6/1941 | Kern |
| 2,302,790 A | * | 11/1942 | Modigliani ............... 28/283 |
| 3,505,155 A | | 4/1970 | Balch et al. |

(Continued)

FOREIGN PATENT DOCUMENTS

EP    A 0 837 162    4/1998

(Continued)

*Primary Examiner*—Amy B Vanatta
(74) *Attorney, Agent, or Firm*—Oliff & Berridge, PLC

(57) ABSTRACT

A method of producing a spread multi-filament bundle along with an apparatus used in the same, by which a multi-filament bundle is spread with high speed and facility, and a high quality spread multi-filament bundle or sheet with the component monofilaments thereof aligned in parallel widthwise and uniformly distributed in density is produced. The multi-filament bundle in carriage is subject to fluctuation of a tensile force applied thereto alternatively between tension and relaxation by locally and reciprocally pressing the bundle fed from a yarn supplier crosswise with regard to a moving course of the bundle, and the multi-filament bundle moving under the fluctuation passes in suspension through a fluid flowing portion, and the multi-filament bundle is subject to fluidal resistance while the bundle moving through the fluid flowing portion so as to bend the bundle towards a direction to which a fluid in use flows, and the fluid flows through an interstice between any adjacent monofilaments of the bundle whose bonding is slackened due to the fluidal resistance so as to widen the interstice.

4 Claims, 1 Drawing Sheet

U.S. PATENT DOCUMENTS

| | | | |
|---|---|---|---|
| 3,535,745 A | 10/1970 | Zeidman | |
| 3,698,039 A | 10/1972 | Kalwaites | |
| 3,729,777 A | 5/1973 | Hoffman et al. | |
| 3,960,645 A | 6/1976 | Brackmann et al. | |
| 3,961,396 A | 6/1976 | Lubitzsch | |
| 4,179,776 A | 12/1979 | Wortman | |
| 4,259,769 A | 4/1981 | Greve et al. | |
| 5,042,122 A | 8/1991 | Iyer et al. | |
| 5,182,839 A | 2/1993 | Stuart | |
| 5,446,952 A | 9/1995 | Kim et al. | |
| 6,032,342 A | 3/2000 | Kawabe et al. | |
| 6,094,791 A | 8/2000 | Akase et al. | |
| 6,543,106 B1 * | 4/2003 | Ames et al. | 28/283 |
| 6,743,392 B2 * | 6/2004 | Tanaka et al. | 264/444 |
| 6,836,939 B2 | 1/2005 | Guirman et al. | |
| 7,003,856 B2 * | 2/2006 | Hayashi et al. | 28/282 |
| 7,596,834 B2 * | 10/2009 | Shinkado | 19/66 R |

FOREIGN PATENT DOCUMENTS

| | | |
|---|---|---|
| JP | A 52-151362 | 12/1977 |
| JP | A 56-043435 | 4/1981 |
| JP | A 57-077342 | 5/1982 |
| JP | A 01-282362 | 11/1989 |
| JP | A 03-031823 | 5/1991 |
| JP | A 11-172562 | 6/1999 |
| JP | A 2003-213537 | 7/2003 |
| JP | EP 2004-585912 | 8/2004 |

* cited by examiner

[a]

[b]

METHOD OF PRODUCING A SPREAD MULTI-FILAMENT BUNDLE AND AN APPARATUS USED IN THE SAME

CROSS-REFERENCE TO RELATED APPLICATIONS

This is a Continuation of application Ser. No. 10/559,670 filed Dec. 6, 2005, which in turn is a National Phase of PCT/JP2004/010006, which claims priority of Japanese Patent Application No. 2003-193895, filed Jul. 8, 2003 and Japanese Patent Application No. 2004-034778, filed Feb. 12, 2004. The disclosure of the prior applications is hereby incorporated by reference herein in its entirety.

BACKGROUND

1. Technical Field

The invention relates to spreading a multi-filament bundle, in more details, pertaining to a method of mass-producing a high-quality spread multi-filament bundle and sheet and an apparatus used therein wherein a multi-filament bundle is repeatedly put into contact with a fluid free from turbulent stream as many times as necessary while being continuously bent in a wavy form or if required, the bundle in carriage is repeatedly subjected to the fluctuation of the tensile force applied thereto by locally and intermittently pressing the bundle in carriage crosswise with regard to the moving course of the bundle or a linearly back-and-forth friction is further provided widthwise with regard to the bundle in the process of being spread.

2. Background Art

As well known, complex fiber reinforced materials comprising such reinforced fibers as carbon fibers, glass fibers and aramid fibers and such matrix resins as epoxy resin are light in weight and superb in mechanical strength and anti-erosion so that they are widely utilized for such products for the general consumers as a fishing rod and a golf rod and structural parts of industrial machinery as well as for the construction of airplanes and space rockets. For manufacturing such products and parts made from such complex fiber reinforced materials as mentioned above and constructing a fixed shape as required, such materials are generally provided in such condition that a matrix resin is impregnated between the component monofilaments of a pre-impregnation sheet made from such reinforced fibers, the improvement on uniform density and thickness of which pre-impregnation sheet is sought after due to the recent expectation for further weight reduction of such products and components of heavy construction.

The large-scale and inexpensive provision of such pre-impregnation sheet uniform in density and smaller in thickness as mentioned above enables not only thinner and lighter shaped products to be mass-produced, but also pre-impregnation sheets whose monofilaments are uni-directionally aligned to be laminated one over another with the direction of the respective sheets horizontally, vertically or diagonally displaced with regard to each other so as to obtain a multiplex pre-impregnation sheet. The production of such an article as being made from such multiplex pre-impregnation sheet as mentioned above could greatly improve rupture strength of such article. Thus, it is highly expected among the respective industrial circles that a reasonable production technology of a thinner spread multi-filament bundle sheet whose monofilaments are widthwise aligned in parallel and are distributed uniformly in density is established.

In this regard, reasonably producing a pre-impregnation sheet requires that a material cost of reinforced multi-filament bundles to be spread be reduced. Normally, the use of reinforced multi-filament bundle whose monofilaments are less in number with such monofilaments uni-directionally aligned facilitates the production of the pre-impregnation sheet smaller in thickness and whose monofilaments are uniformly distributed in density. However, the reinforced multi-filament bundle whose monofilaments are less in number are expensive in cost so that it is unavoidable that reinforced multi-filament bundle having a number of monofilaments should be used. Thus, it necessitates a method of spreading such reinforced multi-filament bundle having a number of monofilaments to form a thin reinforced multi-filament bundle spread sheet so as to produce a pre-impregnation sheet whose thickness is smaller and whose monofilaments are uniformly distributed in density in a cost-effective manner compared to the prior art.

Conventionally, such methods are known as spreading respective monofilaments by subjecting a multi-filament bundle to circular rods, and splitting respective monofilaments widthwise by water stream or high-pressurized air stream and ultrasonically vibrating respective monofilaments so as to split the bundle. As for some examples of such method by the circular rods, it is disclosed in Japanese Patent Application Laid-open No. 56-43435 that the multi-filament bundles are passed through and in engagement with a revolving roller that vibrates in the axial direction thereof so as to be spread, and it is disclosed in Japanese After-Grant Patent Application Laid-open No. 3-31823 that the multi-filament bundle is passed through and in engagement with a plurality of rollers that are disposed in displacement by 30 degrees to 90 degrees to each other so as to be spread. Then, as for some examples of such method by water stream or high-pressurized air stream, it is disclosed in Japanese Patent Application Laid-open No. 52-151362 that the multi-filament bundle is subjected to high-pressurized fluid so as to be spread, and it is disclosed in Japanese Patent Application Laid-open No. 57-77342 that the multi-filament bundle in carriage is subjected to fluid flowing vertically with regard to the moving direction of the former to apply dispersion force by such fluid to the former so as to be spread. Further, as for an example of such ultrasonic method as mentioned above, it is disclosed in Japanese Patent Application Laid-open No. 1-282362 that the multi-filament bundle is put into contact with a circular rod ultrasonically vibrating in the axial direction thereof in a crosswise manner so as to be spread.

However, any one of the above prior arts is intended for spreading a multi-filament bundle by applying physical force to the same so as to enforcedly move monofilaments comprising the same widthwise while pulling the multi-filament bundle that tends to recover their converged position. In this reason, it causes the width of spread multi-filament bundle to be made smaller than expected and the monofilaments to be damaged, fluffed and cut after all. In change, in case of such circular rod as mentioned above, enhancing the feeding speed of the multi-filament bundle causes the friction resistance between the rod and the multi-filament bundle to be larger so as to further increase the number of monofilaments that are cut during operation while in case of such water stream as mentioned above, a larger heating energy is required for drying up the water impregnated with the monofilaments. Accordingly, conventionally, an effective way is not yet to be established to continuously and stably spread the multi-filament bundle with a higher feeding speed.

Under the above circumstances, to attain the goal, the subject inventors have proposed in Japanese Patent No. 3049225 entitled 'Method of producing a spread fibers sheet and an apparatus used in the same' and in Japanese Patent No.

3064019 entitled 'Method of producing a spread multi-filament bundle sheet and an apparatus used in the same' wherein the multi-filament bundle in a flexibly bent condition is subjected to suction air flowing crosswise with regard to the moving direction of the multi-filament bundle so as to spread the multi-filament bundle wider whose monofilaments are uniformly distributed in density. These methods are successful in spreading the multi-filament bundle wider whose monofilaments are uniformly distributed in density by bending the multi-filament bundle so as to put the monofilaments comprising the same into such condition to facilitate the widthwise movement thereof without enforcement or to put the monofilaments into such condition as facilitating the same to be spread widthwise and by subjecting the monofilaments in such condition to suction air allowing air pass through the respective adjacent monofilaments.

However, such methods as proposed by the subject inventors and mentioned above requires a spreading system having at least a front feeder, a suction air cavity, a back feeder and a bending condition measuring sensor in one unit. Thus, in order to distribute the monofilaments more uniformly in density and spread the multi-filament bundle more widely, it is required that a series of such spreading systems be disposed in succession so as to gradually proceed with the spreading operation of the same, which results in making the total system becoming much larger-in scale and more complicated in structure while spreading operation being simultaneously performed on a number of multi-filament bundles disposed widthwise, it requires that a set of such spreading systems be arranged side by side, which results in the system as a whole being far larger in scale and by far more complicated in structure.

SUMMARY

In view of the inconveniences encountered with the prior art for producing a spread multi-filament bundle, the present invention is to provide a method of efficiently producing a high-quality spread multi-filament bundle and a spread multi-filament bundle sheet whose monofilaments are aligned widthwise in parallel and distributed in a uniformed density and an apparatus used in the same method.

Further, the present invention is to provide a method of producing a spread multi-filament bundle that is wide enough to be used as a reinforced matrix of FRTP (Fiber Reinforced Thermoplastics) and FRP (Fiber Reinforced Plastics) products and between whose adjacent monofilaments a high-viscosity fusible thermoplastic resin is smoothly and uniformly impregnated and an apparatus used in the same method.

Further, the present invention is to provide a method of economically producing a spread multi-filament bundle larger in width enabling such converged monofilaments of higher strength as carbon fibers, glass fibers, ceramic fibers, aromatic polyamide fibers and so forth to be spread in a space-saving and cost-saving manner and an apparatus used in the same method.

Furthermore, the present invention is to provide a method and an apparatus used in the same enabling a multi-filament bundle of higher strength to be instantly spread in a high-speed operation and with ease.

Another purposes of the invention are more concretely explained below.

The methodical and mechanical means adopted herein for solving the above issues are described below with reference to the accompanying drawings.

Then, the 'method of producing a spread multi-filament bundle' according to the invention is characterized in that the tensile force applied to a multi-filament bundle in carriage is fluctuated alternatively and repeatedly between tension and relaxation by locally pressing a multi-filament bundle Tm fed from a yarn supplier 11 (bobbin, cone, cheese and so forth) widthwise with regard to the moving course of the bundle Tm and the bundle Tm under such fluctuation is passed through in suspension a fluid flowing portion 31a of the fluid flowing spreader 3 to be subjected to fluidal resistance so as to bend towards the direction to which a fluid flows, and such fluid flows through an interstice formed between the adjacent monofilaments of the bundle whose bonding is slackened due to such fluidal resistance so as to widen such interstice between the adjacent monofilaments thereof, thereby, further promoting spreading operation on the bundle and widely spreading the bundle Tm.

Then, the 'apparatus for spreading a multi-filament bundle used in the above method' according to the invention that is adopted as a mechanical means for solving the above issues is characterized in comprising a yarn supplier 11 (such as bobbin, cone, cheese) around which a multi-filament bundle Tm is wound; a multi-filament bundle feeder 2 to unwind and feed the bundle Tm under a certain tensile force from the yarn supplier 11 with the drawing-back of the bundle Tm in check; a fluid flowing spreader 3 comprising a fluid flowing portion 31a disposed along the moving course of the bundle Tm in feed to put a fluid into contact crosswise with regard to and pass the fluid through the bundle Tm in passage with the latter supported thereon in suspension and to bend the bundle Tm towards the direction to which such fluid flows so as to spread the same; a tensile force variable system 4 to change the tensile force applied to the bundle Tm in carriage alternatively between tension and relaxation.

Now, several supplemental follow-ups of the present invention are described below in terms of the technical matters of the present invention. Although the multi-filament bundle that the present invention encompasses is mainly of such conventionally known type as a number of monofilaments of higher strength made from carbon fibers, glass fibers, ceramic fibers, polyoxymethylene fibers, polyamide fibers and so forth being converged that are used as reinforced matrix of FRTP (Fiber Reinforced Thermoplastics) and FRP (Fiber Reinforced Plastics) products, the present invention also covers a multi-filament bundle in which a number of metallic monofilaments or conventionally known synthetic monofilaments are converged into a multi-filament bundle and could encompass any types of multi-filament bundles if required other than those mentioned above.

Effect

As described up to here, the invention is arranged such that a multi-filament bundle Tm unwound and fed from the yarn supplier 11 is subjected to fluidal resistance while passing over in suspension a fluid flowing portion 31a so as to be bent towards the fluid flowing direction, through any adjacent monofilaments of which bundle as subjected to such fluidal resistance and slackened the fluid in use flows and the multi-filament bundle in carriage is subjected to fluctuation of a tensile force applied to the bundle alternatively between tension and relaxation by locally and reciprocally pressing the bundle subjected to spreading operation crosswise with regard to a moving course of said bundle, so that an ideal widely spread multi-filament bundle with any adjacent monofilaments thereof tangentially aligned in parallel and uniform in density is efficiently mass-produced.

Further, by use of such an extremely streamlined apparatus as essentially consisting of a yarn supplier, a multi-filament bundle feeder, a fluid flowing spreader comprising a fluid flowing portion and a tensile force variable system to change the tensile force applied to a multi-filament bundle alternatively between tension and relaxation, a multi-filament bundle of higher strength comprising carbon fibers, glass fibers, ceramic fibers, polyoxymethylene fibers, aromatic polyamide fibers and so forth is processed into a high-quality widely spread multi-filament bundle in a space-saving and cost-saving manner with high efficiency.

DETAILED DESCRIPTION OF EMBODIMENTS

Hereafter, the preferred embodiment of the invention is described in more details with reference to the accompanying drawings.

Embodiment

Figure 1:
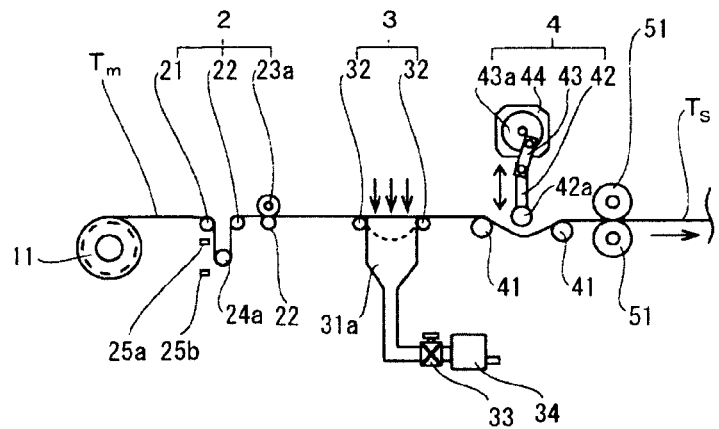
FIG. 1 is an explanatory side view of an apparatus example used in the method of producing a spread multi-filament bundle according to the embodiment hereof.
Figure 2:
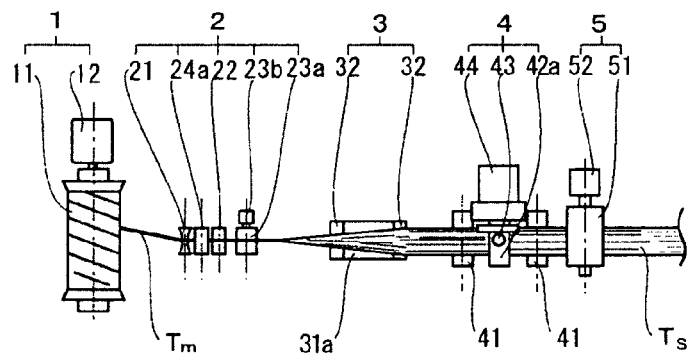
FIG. 2 is an explanatory plan view of the apparatus example shown in FIG. 1.
Figure 3:
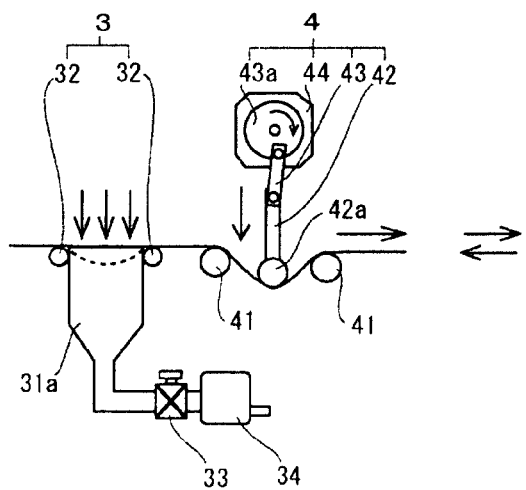
FIGS. 3 (a) and (b) are illustrations to show the effect on the multi-filament bundle passing through the fluid flowing portion according to the operation of the tensile force variable system.
Figure 3:
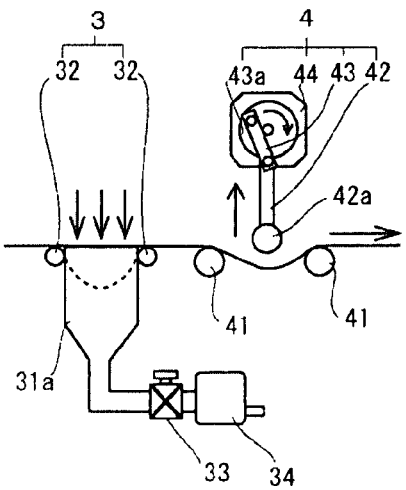

In the present embodiment, the mechanism by which one multi-filament bundle is spread by means of an apparatus example as shown in FIGS. 1 through 3 is explained as follows.

Apparatus Example

Reference numeral 11 in FIGS. 1 and 2 indicates a yarn supplier of bobbin type around which a long multi-filament bundle Tm is wound, which supplier is supported into a bobbin shaft 12a engaged to a power shaft of a yarn supply motor 12 and from which supplier the bundle Tm is unwound by the rotation of the motor 12. The multi-filament bundle that the present embodiment encompasses includes such reinforced fibers bundles whose component monofilaments are of higher strength as a carbon fibers bundle, a glass fibers bundle, an aramid fibers bundle and a ceramic fibers bundle and such thermoplastic resin fibers bundles as synthetic monofilaments made from polyethylene, polypropylene, nylon 6, nylon 66, nylon 12, polyethylene terephthalate, polyphenylene sulfide, polyether ether ketone being bundled. It should be noted that either a non-stranded multi-filament bundle or a preliminarily untwisted multi-filament bundle is put to use for the purpose of saving production cost, since a stranded multi-filament bundle can not be spread continuously without being completely untwisted.

Then, reference numeral 2 in the drawings indicates a multi-filament bundle feeder, which feeder comprises a rotatable guide roller 21 to support a multi-filament bundle Tm unwound from the yarn supplier 11 in a fixed position; a pair of anterior and posterior revolving support rollers 22 and 22 to support the bundle Tm at a downstream side from the guide roller 21; a tension stabilizing roller 24a rotatably disposed between the support roller 22 at an upstream side and the guide roller 21 to abut the bundle Tm in passage and to ascend and descend according to change of tensile force applied to the bundle Tm so as to keep a tension of the bundle Tm constant; an upper limit position sensor 25a to detect the upper limit position of the tension stabilizing roller 24a and a lower limit position sensor 25b to detect the lower limit position thereof; a nip roller 23a to press against the support roller 22 at a downstream side and to roll with the bundle Tm sandwiched between itself and the roller 22; and a uni-directionally rotatable clutch 23b to rotate the nip roller 23a only to a feeding direction of the bundle Tm so as to prevent the bundle Tm from being drawn back to a reverse direction to the feeding course thereof.

The stabilization of the tensile force applied to the bundle Tm that is drawn out from the yarn supplier 11 of the apparatus example is realized as follows. Namely, the tension stabilizing roller 24a of the multi-filament bundle feeder moves upwards when the tension of the bundle Tm in passage is increased while moving downwards when the same is decreased. Then, when the tension stabilizing roller 24a reaches at the upper limit position thereof, the upper limit position sensor 25a detects such position and a signal to that effect is input to the yarn supply motor 12 to increase the revolving speed of the yarn supplier 11 so as to increase feeding the bundle Tm while to descend the tension stabilizing roller 24a. On the other hand, when the tension stabilizing roller 24a reaches at the lower limit position thereof, the lower limit position sensor 25b detects such position and a signal to that effect is input to the yarn supply motor 12 to decrease the revolving speed of the yarn supplier 11 so as to decrease feeding the bundle Tm. In this way, by use of the apparatus example, the tensile force applied to the bundle Tm is always kept constant.

The bundle Tm provided with a certain initial tension as mentioned above proceeds to run between the support roller 22 and the nip roller 23a. In this regard, the nip roller 23a is provided with a uni-directionally rotatable clutch 23b so that the nip roller 23a does not rotate to a reverse direction to the feeding direction of the bundle and there is no effect on the upstream side from the nip roller 23a even if the bundle is subjected to reciprocal tension and relaxation by a tensile force variable system disposed at a downstream side as mentioned below, thereby, the bundle Tm being unwound along the feeding course thereof with a constant tension.

Then, reference numeral 3 in the drawings indicates a fluid flowing spreader of cavity tube type. A suction cavity tube, the aperture of which tube acts as a fluid flowing portion 31a, is adopted herein for the fluid flowing spreader. This fluid flowing portion 31a is disposed in the same elevation level as the feeding course of the bundle Tm, on an entrance side and an exit side respectively of which portion 31a a guide roller 32 is disposed to keep the bundle Tm in passage at a certain elevation level. The fluid flowing portion 31a acting as a suction cavity tube is provided with a suction air pump 34, and the operation of the suction air pump 34 with a flow rate adjustment valve 33 regulated as necessary causes suction air stream with a flow rate as required inside the fluid flowing portion 31a.

Then, reference numeral 4 in the drawings indicates a tensile force variable system, which system is disposed between a pair of anterior and posterior support rollers 41 and 41 horizontally disposed with an interval therebetween at a downstream side from the fluid flowing spreader 3. This tensile force variable system 4 of the apparatus example comprises an elevating rod 42 provided with a press roller 42a at a lower end portion thereof, an extensile and contractile crank arm 43 engaged to the elevating rod 42; and a crank motor 44 whose power shaft is provided with a rotor 43a in engagement to the crank arm 43. According to the ascend and descend of the elevating rod 42 caused through the crank arm 43 by driving the crank motor 44 so as to rotate the rotor 43a, the press roller 42a repeats to perform a push-down and detachment operation with regard to the bundle Tm in the process of being spread so that the tensile force applied to the bundle Tm changes alternatively between tension and relaxation. This tensile force variable system 4 is disposed between a pair of support rollers 41 and 41 that support the bundle in the process of being spread at a certain elevation level. To note, the change of the revolving speed of the crank motor 44 allows the reciprocal cycle of tension and relaxation performed on the bundle Tm to be regulated.

While the bundle Tm is in the middle of passing through the fluid flowing portion 31a in suspension after having passed a section where the bundle Tm is sandwiched between the support roller 22 and the nip roller 23a, the bundle Tm is reciprocally subjected to the sudden change of the tensile force applied thereto between tension and relaxation by the press roller 42a of the tensile force variable system 4 provided at a downstream side, which change affects the section where the bundle Tm is sandwiched between the support roller 22 and the nip roller 23a. Thus, upon the bundle Tm affected by such reciprocal tension and relaxation as mentioned above being subjected to suction air stream, when the tensile force applied to the bundle Tm changes from tension to relaxation as shown by the arrow (a) to (b) in FIG. 3, the bundle Tm bends towards the direction to which the air stream flows so that the length of the respective monofilaments existing inside the fluid flowing portion 31a momentarily becomes larger so as to facilitate the bundle being spread widthwise. That is to say, the relaxation of the bundle slackens the tension between adjacent monofilaments so as to increase the volume of air stream to flow through such adjacent monofilaments, which results in the spreading operation being intensified. On the contrary, when the tensile force applied to the bundle changes from relaxation to tension as shown by the arrow (b) to (a) in FIG. 3, the degree to which the bundle Tm bends inside the fluid flowing portion 31a reduces, and the respective component monofilaments are aligned in a straight manner as if they are combed by the suction air stream with the bundle in passage maintained as it is spread.

The spread multi-filament bundle Ts in this way is taken up by a take-up mechanism 5, which mechanism comprises a pair of take-up rollers 51 and 51 and a take-up motor 52. To follow up the above explanation, the moving speed of the bundle is determined by the revolving speed of the motor 52, which moving speed is adjustable by controlling the motor 52 with a speed setter not shown in the drawings. Further, a wind-up beam not shown in the drawings is disposed at a downstream side from the take-up mechanism 5 to wind up the spread multi-filament bundle Ts, and a pre-impregnation device not shown in the drawings may be provided in series to perform an impregnation of the variety of resins on the spread multi-filament bundle Ts, if required.

Hereafter, the practical aspect of the invention is examined by showing the following test example on the basis of the above embodiment.

Text Example

In order to examine the workability of the above embodiment, the spreading operation is performed on a carbon fiber bundle by use of an apparatus arranged such that a hot air fan heater used as a heater is further provided over the fluid flowing spreader 3 of the apparatus example as shown in FIG. 1.

In this test example, a carbon fibers bundle 12K marketed under the trade name of 'PYROFIL TR 50S' produced by Mitsubishi Rayon Co., Ltd., in which 12,000 carbon monofilaments respectively of 7 μm in diameter are bundled, is adopted for a test sample. Herein, the initial tensile force of 40 g is applied to the carbon fibers bundle Tm by the tension stabilizing roller 24a, which bundle is fed to the fluid flowing spreader 3 of suction cavity type. The apparatus adopted herein is arranged as follows.

(1) The dimension of the opening over the fluid flowing portion 31a being 40 mm in width and 30 mm in length along a feeding course of the bundle and the flow velocity of the suction air stream being set at 20 m/second in an empty condition.
(2) On an entrance side and an exit side of the fluid flowing portion 31a, a guide roller 32 having 10 mm in diameter and made from stainless steel, the surface of which roller is satin finished, being disposed.
(3) The heater (hot air fan) directed towards the fluid flowing portion 31a being capable of continuously blowing hot air of 120 degrees Centigrade thereto.
(4) The crank motor 44 of the tensile force variable system 4 being designed at 350 rpm and the pushdown stroke by the rod 42 to the bundle being set at 20 mm.
(5) The take-up speed of the bundle by the take-up system 5 being set at 10 m/minute.

In this test example, the carbon fibers bundle 12 K whose initial width is 5 mm and whose initial thickness is 0.15 mm before being subjected to the spreading operation is formed into a spread fibers bundle Ts whose width is 20 mm and whose thickness is 0.04 mm. Commercially speaking, it is confirmed that this spread fibers bundle Ts is stable in spread width, the alignment and distribution of which monofilaments are good.

The preferred embodiment of the invention is substantially described above, to which embodiment the invention is not limited, but it can be modified into various manners within the scope of the accompanying patent claims.

INDUSTRIAL APPLICABILITY

In a method of producing a spread multi-filament bundle and an apparatus used in the same according to the invention, such mechanism is adopted as a multi-filament bundle Tm unwound and fed from the yarn supplier 11 with a certain feeding speed being subjected to fluidal resistance while passing over in suspension a fluid flowing portion so as to be bent towards the fluid flowing direction, through any adjacent monofilaments of which bundle as subjected to such fluidal resistance and slackened the fluid in use flows and the multi-filament bundle in carriage being subjected to fluctuation of a tensile force applied to the bundle alternatively between tension and relaxation by locally and reciprocally pressing the bundle subjected to spreading operation crosswise with regard to a moving course of said bundle, so that a spread multi-filament bundle is produced in an efficient manner and a high-quality and homogenous spread multi-filament bundle sheet with any adjacent monofilaments thereof tangentially aligned in parallel and uniform in density is efficiently mass-produced.

The structural arrangement of the apparatus according to the invention is streamlined as mentioned above, by use of which apparatus such multi-filament bundles of higher strength comprising carbon fibers, glass fibers, ceramic fibers, polyoxymethylene fibers, aromatic polyamide fibers are spread with high efficiency and in a space-saving manner so as to produce a spread multi-filament bundle or a spread multi-filament bundle sheet with lower production cost and higher productivity, so that the industrial applicability of the invention is very high.

What is claimed is:

1. A method of producing a spread multi-filament bundle comprising the steps of: subjecting a multi-filament bundle in carriage to fluctuation of a tensile force applied to the bundle alternatively between tension and relaxation by locally and reciprocally pressing the bundle fed from a yarn supplier crosswise with regard to a moving course of the bundle; passing in suspension the multi-filament bundle moving under the fluctuation through a fluid flowing portion; subjecting the multi-filament bundle to fluidal resistance while the bundle is moving through the fluid flowing portion so as to bend the bundle towards a direction to which a fluid in use flows; and flowing the fluid through an interstice between any adjacent monofilaments of the bundle whose bonding is slackened due to the fluidal resistance so as to widen the interstice, thereby, promoting spreading operation on the bundle so as to widely spread the multi-filament bundle.

2. A method of producing a spread multi-filament bundle according to claim 1 wherein the multi-filament bundle unwound from the yarn supplier is fed with a restraint of being drawn back and the multi-filament bundle restrained from being drawn back and moving to a downstream side is spread when the bundle passes through the fluid flowing portion.

3. An apparatus for producing a spread multi-filament bundle comprising a yarn supplier on which a multi-filament bundle is wound; a multi-filament bundle feeder to unwind a multi-filament bundle from the yarn supplier under a certain tension and to feed the multi-filament bundle with a restraint from being drawn back while keeping the multi-filament bundle in a plane; a fluid flowing spreader comprising a fluid flowing portion disposed along a moving course of the bundle to put a fluid into contact with and pass the fluid through the bundle with the bundle in carriage supported in suspension so as to bend the bundle towards a direction to which the fluid flows and spread the bundle, said fluid flowing crosswise with regard to said moving course; and a tensile force variable system to change a tensile force applied to the bundle alternatively between tension and relaxation by locally and reciprocally pressing the bundle in carriage.

4. An apparatus for producing a spread multi-filament bundle according to claim 3 wherein the tensile force variable system comprises an elevating rod provided with a press roller at its lower end portion; a contractile and extensile crank arm engaged to the elevating rod; and a crank motor whose power shaft is provided with a rotor in engagement with the crank arm.

* * * * *